United States Patent [19]

Linzell

[11] Patent Number: 5,519,182
[45] Date of Patent: May 21, 1996

[54] GALLED JOINTS MADE WITH ELECTRIC HEATING

[75] Inventor: Geoffrey R. Linzell, Hatfield, England

[73] Assignee: Ball Burnishing Machine Tools Limited, Hatfield, England

[21] Appl. No.: 256,569
[22] PCT Filed: Jan. 11, 1993
[86] PCT No.: PCT/GB93/00046
  § 371 Date: Jul. 14, 1994
  § 102(e) Date: Jul. 14, 1994
[87] PCT Pub. No.: WO93/13908
  PCT Pub. Date: Jul. 22, 1993

[30] Foreign Application Priority Data

Jan. 14, 1992 [GB] United Kingdom ............ 9200727

[51] Int. Cl.⁶ .................................................. B23K 20/12
[52] U.S. Cl. ...................... 219/117.1; 219/78.02; 228/2.1; 228/112.1
[58] Field of Search .................. 219/78.02, 78.12, 219/93, 117.1; 228/2.1, 112.1

[56] References Cited

U.S. PATENT DOCUMENTS

| | | | |
|---|---|---|---|
| 3,718,334 | 2/1973 | Kiwalle | 277/27 |
| 3,851,138 | 11/1974 | Metcarfe et al. | 219/83 |
| 4,181,845 | 1/1980 | Bolton | 219/8.5 |
| 5,165,589 | 11/1992 | Nied et al. | 228/108 |
| 5,240,167 | 8/1993 | Ferte et al. | 228/114.5 |
| 5,348,210 | 9/1994 | Linzell | 228/115 |

Primary Examiner—Teresa J. Walberg
Assistant Examiner—J. Pelham
Attorney, Agent, or Firm—Synnestvedt & Lechner

[57] ABSTRACT

A method involving galling for securing against lateral motion two bodies held in face-to-face asperity contact, thereby to make a join between the two bodies, in which in the preferred form of the method there is inserted into the interface of the surfaces of the two bodies a material that on minimal initial lateral relative motion of the two surfaces promotes rapid but controllable "galling" between the two surfaces, the galling binding the surfaces against further such motion, and the use in such method of electric current during formation of the join to heat and soften the touching asperities, thus enabling them to deform and flatten more rapidly to bring other smaller asperities nearby into contact and thus increase the number of gall sites, and/or use of electric current after formation of the join to effect stimulation and/or acceleration of the formation of diffusion bonds across the opposed faces of the join.

18 Claims, 4 Drawing Sheets

GALLED JOINTS MADE WITH ELECTRIC HEATING

This invention relates to joints, and concerns in particular joints in which the coupling between two surfaces is caused by friction and other intersurface forces jamming the two together, especially those joints, and joining techniques, the subject of our International Application PCT/GB 91/00,950.

There are many ways in which one article can be joined (or jointed) to another, and those appropriate for use in any particular case will generally depend upon the circumstances. For example, two pieces of wood can be joined by nails or screws, or by some cunningly shaped interlocking joint, with or without glue, while two pieces of metal can be glued, soldered, brazed, welded, bolted, riveted . . . and so on. It is even possible to make good joints that are held together simply by the friction between the two parts. For instance, the pegs holding the strings of a violin stay in place purely by friction between the side of each peg and the side of the hole it is pushed into, and friction, or "interference", fits of one metal article onto another are quite common, examples being the securing of a gear-ring to a fly-wheel, typically as used in an automobile engine, and of a metal tyre to a railway wheel. A friction joint usually has only shear strength, thus resisting motion in the "plane" of the join (such as might be caused by torsional or push-off forces), and effectively no tensile strength, thus not resisting pulling forces normal to the join. Indeed, such joints show no residual tensile strength if the forces maintaining the two bodies together are removed, and usually fall apart. Nevertheless, this can be perfectly acceptable provided the application, and specifically the physical design of the joint itself, allows for this. Thus, a joint between a rod—or shaft-like member and a body fitting, collar-like, around it, as in a violin string peg fitting into the hole in the neck of the violin, is quite satisfactory; the pegs lock tight against rotation even though they pull out quite easily.

A type of joint that involves friction in its formation, though it does not use friction as the bonding force, is the friction weld, where the two parts are rubbed repeatedly and rapidly against each other (typically several hundred times in a few seconds) until the friction between the touching surfaces makes them hot enough for their material to soften and then to mix when the rubbing is stopped and the two faces are forced/forged together (with forces of the order of tons per square inch [or a few hundred Newtons per square millimetre], expelling any contaminated remnants from the original surfaces)—to cause complete fusion between the bodies—to give a true weld (molecular interpenetration) of one part to the other. It is possible, but not common, to employ some form of friction promoter—a fine abrasive grit such as carborundum (alumina) or sand (silica)—between the two surfaces; once they are heated up, however, the promoter is squeezed out as the two surfaces are pushed/forged together (again with considerable "upsetting" deformation) to make the weld itself. A welded joint made in this way has, like any true weld in which the material of the two parts has actually interpenetrated, both shear (sideways) and tensile (lengthways) strength, which may well be an advantage, but suffers from the considerable disadvantage that the two parts must be heated to a relatively high temperature, which will result in heat-affected zones either side of the joint in which the basic state and physical condition of the material may be significantly changed.

Another type of metal-to-metal joint involving friction during formation, but without the generation of high temperatures within the bulk metal, is the cold pressure weld, especially that form thereof known as the cold pressure shear weld. To produce reliable results with this method, the surfaces must be carefully preconditioned (by wire brush cleaning immediately before assembly, or preferably nickel plating).

In an ordinary cold pressure weld the two pieces to be joined are forged together with a force sufficient to cause between 30% and 60% surface enlargement at the interface (as with friction welding, this is several hundred Newtons per square millimetre). This severely disrupts the oxide layer normally covering the surfaces (see below), allowing the underlying clean, unreacted metal surfaces then to come into intimate contact under the still-applied external forging force; they then fuse together by molecular diffusion, forming a true welded bond having good tensile strength. In the shear version there is applied as well slow relative sliding and shear forces (these are then discontinued to allow the weld to take place udder the maintained forging force), to give improved bonds with a reduced degree of deformation.

The invention the subject of our aforementioned Application relates to a novel, and extremely superior, method of making what may for convenience be regarded as friction joints—that is to say, joints between the touching surfaces of two parts that are held in contact (but not by a force sufficient to cause forging, as in the above-mentioned cases) and that would otherwise move laterally past one another parallel to the touching plane (and so normal to the holding force), the method involving some minimal initial lateral movement of the two surfaces sufficient to cause some asperity deformation, welding and shearing (welding between opposed and touching microprojections) under special conditions but not sufficient to raise the bulk temperature of either to a level where bulk welding will occur. The method, which can result in joints having as much as 90% of the shear strength (resisting further lateral movement) of the weaker material of the two joined bodies, but with the expenditure of as little as 5% of the energy necessary to form an actual friction weld, involves the phenomenon of "galling" (as explained below; the special conditions lead to extremely rapid, even exponential, galling—build-up of material transfer—and ploughing, so as to form two physically interlocked arrays each of which is bonded to its respective surface by welds but is not so bonded to the other).

Under the ambient conditions on Earth—an atmosphere to a large part formed of the highly reactive gas oxygen—the surfaces of most common metals (such as iron or aluminum) are covered in an oxide film. When two chemically similar metal surfaces are rubbed together, with sufficient force—of the order of a few tens of Newtons per square millimetre—normal to the motion so as to hold them in firm contact, it is common for microwelding shear forces ("friction") to occur between the two as a result of plastic deformation of the material at asperity contact points (where the oxide film is disrupted) at either or both surface, and for microscopically small amounts of material from one surface to be deposited on the other (if one is of a relatively soft material, then that is deposited on the harder), resulting in wear. The rate of this transfer is controlled generally by the ability of the surface to repair the damage to its oxide layer (or by the interposition of other materials, such as lubricants with chlorine-containing additives to produce chlorides at the oxide-damage site, to act as a temporary substitute for the oxide layer). Under most conditions the situation is self-regulating, and the effect is to keep the transfer minimal.

The deposits are referred to as "galls" by analogy with the biological gall (defined as an abnormal localized swelling or outgrowth), and the process of their creation is known as "galling". It might be expected that galling between two adjacent surfaces held together would enhance a frictional joint between the two: what has now been found is that extensive such galling can reliably be caused with minimal rubbing motion of the two surfaces, and under minimal pressure, and that the "friction" joints that are then formed are extremely strong in terms of their ability to withstand further lateral movement (the coefficient of friction between the two surfaces can be raised to and controlled at values of from 0.1 to 5, and even greater). More particularly, it has been found that such joints can readily, reliably, predictably and controllably be formed with the use of an "anti-lubricant"—a "seizure agent"—to cause the two touching (especially metal) surfaces to bind together against sliding movement.

Accordingly, the invention the subject of our aforementioned Application provides a method of securing against lateral motion two bodies held in face-to-face asperity contact, thereby to make a join between the two bodies, in which method there is inserted into the interface between the two bodies a material that on minimal initial lateral relative motion of the two surfaces promotes rapid but controllable "galling" between the two surfaces, this galling binding the surfaces against further such motion.

The term "galling" as used herein refers both to the formation of visible, significant galls as quite large quantities of material are transferred from one surface to the other, and to the formation of visually less significant, even microscopic, galls in those not infrequent cases where the amount of material transferred is much smaller—albeit effective. In a more general sense, then, the "galling" effected in the method of the aforementioned Application's invention and may be defined as being, the result of high levels of friction evenly disrupting the relevant surfaces and causing controlled transfer of the surface material from one body to the other to produce an "array" of mechanically meshing recesses and protrusions that, as a result of the intimate face-to-face contact between the two surfaces, couple together and interlock to resist further lateral motion.

The present invention relates both to an improvement of and to an addition to the invention of the aforementioned Application. More specifically, it relates to such an improvement as extends the method of the aforementioned Application to facilitate its use over a wider range of interfacial conditions. Thus, it allows a relaxation of the practical manufacturing tolerances and surface roughness criteria needed to make reliable mechanically interlocked friction joints by galling. Moreover, it extends the use of the method to cases where the interface contact forces due to rubbing cannot be relied on to cause even galling due to the low elastic strength of the parts being joined. And as regards the addition to the invention of the aforementioned Application, the present invention permits in some favourably configured joints the converting of the galled contacts within a rubbed joint into actual inter-metallic diffusion bonds across the interlocked (joined) faces in a joint to form continuous welds. All this is enabled, as is explained further hereinafter, by subjecting the joint as it is formed to localised heating, conveniently by the passage of an electric current therethrough.

First, then, the improvement aspect of the present invention is now described in more detail.

The mechanically-interlocked joints formed by the method of the aforementioned Application use galling as a means of enhancing their mechanical strength over simple interference joints. For optimum mechanical and fatigue strength these joints need an even distribution of gall sites of consistent size (preferably small rather then large), and for these to be formed evenly distributed between the rubbed faces there must be enough asperities brought into firm sliding contact and sufficient energy available to cause rapid and substantial plastic deformation in these contacting asperities as the surfaces are rubbed. If a gall enhancing anti-lubricant fluid is present the galls will initiate at asperity contact points with lower levels of force and deformation than would otherwise be the case.

However, even distribution of gall sites does not always occur, and the method of the present invention provides a means of improving the quality of the joint by increasing the number of asperity contact sites, and thus the chances of the distribution of gall sites being more even. For example, if the combination of tolerances and surface roughness in a given joint are at their least favourable limits (known as the "worst case") for a particular pre-assembly specification, then there is a minimum of asperities likely to make contact, and so the best possible use must be made of these. Accordingly, if, as a joint is being formed (rubbed), the supplied external mechanical energy is supplemented by more energy in the form of an electric current flowed across the joint—and the current flow will be only through those asperities in contact—so the current, providing it is sufficiently powerful, will selectively heat and soften the touching asperities, and this will enable them to deform and flatten more rapidly to bring other smaller asperities nearby into contact and thus increase the number of gall sites. It is this concept that is the improvement aspect of the present invention, as is now explained.

In the formation of the type of friction joint with which the invention is concerned a necessary effect is the plastic deformation of asperity contacts, so that one minimum condition for galling to occur is a force sufficient to deform the asperities on the surfaces as they are rubbed together. The number of deformed asperities will generally increase with this rubbing force, and in practice there is a minimum force below which it is not possible to form a joint in this way at all, and thus (it is believed) below which few if any asperities suffer the needed deformation.

Unfortunately, low rubbing forces, which turn out to be insufficient for joining, may be necessary for other reasons, such as when joining low strength parts one to the other (obviously, in most practical conformal joints the maximum force between the two bodies is determined by the mechanical strength of the weaker of the two), typical examples being the thin-walled tubes commonly used for bicycle frames or in the construction of lightweight aerial towers. Not only does the use of low forces cause limited galling, but that galling that does occur tends to be selective, leading to a few concentrated "pile-ups" of galled material large enough to form a wedge or ball, and so lift and hold large areas of the rubbing surfaces apart. Naturally, this prevents further effective inter-surface contact over large areas within the joint, and yet further reduces the joint's strength.

In these circumstances it would clearly be helpful if the asperities, and any large accumulations of gall material, could be softened by the application of external energy other than that available from the rubbing effect, so that they deform more readily but under a lower applied force. Of course, this effect can be achieved by a general increase in the temperature of the bodies, but the benefit of this is limited because as the temperature rises so the strength of the complete assembly is reduced, whereupon the stress providing the forces holding the faces in contact is itself reduced, and the advantage of the heat-softening is lost.

What is required is a method of selectively applying heat only to those asperities actually in contact—and this can be accomplished, and is the basis of the present invention, by passing an electric current between the surfaces, for the current will only pass between touching asperities, and therefore the localised, and transient, heating effect it causes will occur only at those asperities, Moreover, the net heating of the bodies is almost insignificant—no more than a few hundred or so degrees Celsius, and is certainly far too small to cause a significant reduction in stress, and so a corresponding undesirable reduction in rubbing force. The desired result is the softening of those asperities only, and their ready deformation at much lower rubbing forces. And the bigger asperities come into contact first, and so are softened first by the heating current passing therethrough, and then deform and flatten to allow the many smaller asperities to come into contact.

In one aspect, therefore, the invention provides an improved version of the method the subject of our aforementioned Application—which is a method of securing against lateral motion two bodies held in face-to-face asperity contact, thereby to make a join between the two bodies, by inserting into the interface between the two bodies a material that on minimal initial lateral relative motion of the two surfaces promotes rapid but controllable "galling" between the two surfaces, this galling binding the surfaces against further such motion—the improvement seeking to increase the galling potential of the two bodies surfaces when placed in rubbing asperity contact in the presence of the gall-promoting material by the expedient of passing an electric current between the faces while the join is being formed.

It will be understood that, as observed above, upon initial contact and or minimal lateral relative motion of the two surfaces the electrical current passing therebetween will only flow through contacting asperities, to heat and soften them, and thus to cause them to deform and compress more readily so to bring other, smaller asperities into contact (and, of course, each asperity contact has the potential to develop a gall). Moreover, it should be noted that while galls left in contact between the surfaces will occasionally develop over a comparatively long time period into diffusion bonds, experience shows this is not a reliable process for forming such bonds, and if diffusion bonding is required then, as in the additive aspect of the invention (as described in more detail hereinafter), it is preferable if the current flow continue after the applied relative motion ceases, thereby predictably to form true integral welds.

The method of the present invention applies to all friction joints made using galling, enhanced by a gall-promoting agent, as a strengthening process. If the flow of current is maintained at sufficiently high levels during the rubbing then the method will result in a more even galling, to make a superior joint with more evenly distributed mechanical interlocks of consistent size. As already mentioned, it is particularly useful in joints where the pre-assembly fit is at its least favourable, or when two relatively weak parts, such as thin tubes, are rubbed together (where the parts themselves are of limited strength, this determines the maximum asperity contact pressure). Indeed, this latter case was the stimulus for developing the method of the invention, and was discussed above.

Both general and specific comments about the method of the invention insofar as it involves the method of the invention which is the subject of the aforementioned Application are, of course, described in full in that Application. Nevertheless, it might be convenient to repeat some of those points here.

The invention provides a method of securing two held-together bodies to make a join (or joint), and can especially be applied to forming a joint between the two bodies where the shape of the bodies, and the way in which they interact, is such as to hold them together, except against movement sideways to the holding forces. Such joints are usually of the type (like the violin peg) where one body is within and surrounded by the other—they are concentric or axio-symmetric joints— so that the necessary retention of the two bodies together and in contact is merely a matter of the shape and design of the joint, coupled with the physical properties of the bodies. Typical examples are cams on camshafts, weights on counterbalance shafts, interconnecting webs in crankshafts, and gear wheels on gearshafts, or two rods or pipes joined by a connector ferrule.

The method of the invention applies in principle to bodies of any material if there can be caused galling between the two and if an electric current can be passed between them, but in practice the method is really best suited to bodies made from metal. The metal may be any of the commonplace metals, such as iron and aluminum (and their alloys), as well as the slightly less usual ones, such as nickel, cobalt and titanium (and their alloys), but whereas pieces made from the same metal can be binded in this manner that is not always so when the pieces are of different metals. For the most part, the method of the invention seems especially suited to the making of joints between bodies of iron and its alloys (these alloys will commonly be steels, and both ferritic and austenitic will bind to themselves and to each other).

In the method of the invention a material—a gall-promoting, binding or "seizure" agent—is inserted into the interface between the two bodies, this material being one that on minimal initial lateral motion of one surface relative to the other causes rapid "galling" between the two surfaces, resulting in the two seizing or binding together. It has been found that certain silicones—silicones are polymers of diorganyl siloxanes [-O-Si(R2)-], and are commonly referred to as polysiloxanes, the medium molecular weight versions of which are oils—when used in small quantities (to form naturally thin films) result not in lubrication but instead in increased levels of friction between sliding metal surfaces, so acting as so-called "anti-lubrication" agents—that is, they appear to have little or no static or boundary lubrication properties, and appear instead positively to promote friction-causing galling. Accordingly, for applying the method of the invention of the aforementioned Application, and thus the method of the present invention, to the binding of two metal surfaces, there is very preferably employed, as the material promoting the galling (as the "anti-lubricant", or "seizure agent"), a suitable silicone oil. Details of the chemical nature of the preferred silicone oils are given hereinafter.

The anti-lubricant/seizure agent may itself directly promote galling, or it may do so indirectly, by giving rise, under the conditions of use, to a material that does itself promotes galling. The silicone oils are believed, when subjected to the heating (chemical) or shear forces (mechanical) generated by minimal initial lateral motion (as the various "high" points on the two surfaces interact with each other, in asperity contact), to break down chemically into a form that promotes "galling".

As noted above, the surfaces of most common metals (such as iron or aluminum) are covered in an oxide film. However, galling between two metal surfaces is a phenomenon that appears to occur most easily when the surfaces being rubbed together are clean, and when the protective oxide layer has been disrupted or chemically weakened. Accordingly, to promote galling it appears desirable to employ a material that acts to remove at least some of the surface oxide (and preferably to stop such a layer reforming, perhaps by scavenging free oxygen from the environs). It is believed that such an oxide-layer-removal and oxygen-scavenging action is effected by the preferred silicone oils. More especially, it is believed that the preferred silicone oils are materials that break down into products having strong oxygen-scavenging properties, whereby not only are the facing surfaces of the two metal bodies to be joined cleaned of some or any oxide layer thereon but the remaining material acts as a barrier to delay further oxygen entering the joint and re-establishing the oxide layer while the joint-forming process is under way.

The silicone oils suitable for use as the gall-promoting agent may be one or more of many different types, and because their properties are not necessarily the same it may be advantageous to employ a mixture of several different oils carefully tailored to have the required physical and chemical properties, different materials possibly being used for different metals or combinations of metals. Individual polysiloxane oils may be linear, branched or cyclic molecules (or combinations) having a wide range of molecular weights and properties, though materials that are liquids and of relatively low viscosity (about 50 c/s or less, some as little as 10 c/s) are preferred, because they are easier to insert into the interface and appear to be more effective as gall promoters. Typical examples of such materials are the medium molecular weight poly-(dimethyl)siloxanes, especially those materials commercially available from Dow Corning under the Marks MS 200, Dow Corning 531 and 536, and Dow Corning 344 and 345, all of which are fully described in the relevant Data Sheets. The MS 200 materials, which have many uses including that of lubricants, are siloxanes of the general formula $$Si(R_3)\text{—}(O\text{-}Si[R_2])_n\text{—}O\text{-}Si(R_3)$$

wherein each R, which may be the same or different, is hydrogen or an organic radical, typically an alkyl or aryl group, such as methyl or phenyl, and n is an integer from 1 to about 2000. The 531 and 536 materials, whose normal use is in polishes, are amino, methoxy functional polydimethylsiloxanes (the contained functional—that is, reactive—amino and methoxy groups cause the materials to bond chemically to the surfaces to which they are applied, and to polymerise further in the presence of water vapour, changing from liquids into rubbery solids). The 344 and 345 materials, normally used in cosmetic preparations, are respectively cyclic tetramers and pentamers of dimethyl siloxane.

The polysiloxanes are noted for their temperature stability, but nevertheless they break down under severe heating—at temperatures above 300° C., which are to be expected at the asperity contacts when two surfaces are rapidly rubbed together—to give silyl moieties that are highly active scavengers of oxygen, and will easily remove the oxygen from the vicinity in an oxide layer such as that found on an iron or aluminum body, locally reducing the layer to the metal. Thus, when used as the gall-promoting material, and inserted as a thin film between, say, two steel surfaces, the rubbing of the surfaces under minimal initial movement and contact pressure causes the polysiloxane to break down, the breakdown products locally remove (wholly or in part) the protective oxide layer, and the subsequent rubbing produces local welding resulting in galling, whereupon the two surfaces bind together to prevent further movement.

Though possibly it goes without saying, nevertheless it seems worth observing that the two surfaces to be joined by the method of the invention should be reasonably clean, for otherwise the required galling may not occur. Most metals are clean enough, even without being subjected to the normal industrial degreasing processes, and no more need be said about the subject at this time.

It may also be worthy of note that the physical pre-treatment of the surfaces to work harden their asperities and disrupt their oxide film layer, does not seem to be especially beneficial. And in the same context it may be noted that the addition to the gall promoter of a material such as alumina that itself causes friction seems to be detrimental rather than beneficial.

The gall-promoting material—the seizure agent, or anti-lubricant—is inserted into the interface between the two bodies, and in general this should be accomplished so as to make the agent equally available and evenly distributed across the rubbing surfaces. There are many suitable ways in which the insertion can be carried out; some are discussed in the aforementioned Application, and can be summarized as:

Simply assemble the two surfaces (the joint) and then "inject" the seizure agent between the two, perhaps from an outside source, or possibly from a "reservoir" within the joint itself.

Distribute the gall-promoter on the appropriate surface of one or other body, and then position the bodies one on or over the other, possibly with some pre-treatment of one or both surface the better to hold the agent.

Place between the surfaces a carrier of the agent material—a thin layer of sponge, or of the intermediate body (see above), or a porous, scored or recessed shim, jam or washer, soaked in the agent—which is squashed or otherwise deformed to release agent into the joint upon the initial movement of the two surfaces.

The speed of the initial gall-promoting motion is important, particularly when a shim or jam is being inserted into the interface, and the optimum speed for any pair of bodies is best determined by experiment. However, by way of guidance it may be said that the initial motion should preferably be over within half a second, and usually, and for small movements, about a tenth of a second. In general, this will mean motion at from 10 to 30 mm/sec.

On minimal initial lateral motion the seizure agent causes rapid galling between the two surfaces, this galling binding the surfaces against further motion. As observed in the aforementioned Application, exactly what constitutes minimum initial movement, and the exact form this movement should take, is hard to define. However, it will normally be a bodily sideways slipping motion of one piece relative to another, and in the case of a 20 mm deep, 50 mm diameter gear-wheel being attached to a 22 mm diameter shaft, or when a shim or jam is forced into the gap between two main bodies, that a relative displacement of a few millimetres (5 or so) may be sufficient. Where, as will perhaps most often be the case, the joint is of the co-axial, or axio-symmetric, variety, the movement may correspond to an angular movement of as little as a few degrees or as large as 90° or even more.

The method of the invention requires that the two surfaces to be binded together be held in face-to-face, asperity contact. The forces required to do this are minimal, just as the initial motion required to cause galling is minimal, and though it is not easy to put definite figures on them it is nevertheless possible to say that they should be of the order of tens of Newtons/mm². For the most part, where the application of the method of the invention involves one body within another (as in a gearshaft carrying a gear-wheel), the holding forces required are provided by the elastic nature of the two bodies—one slightly extended, the other slightly compressed—as the one is held in a fixed spatial relationship in the other. For a typical mild steel, for instance, with a tensile yield strength of 300 Newtons/mm², the restraining forces between two bodies in a light press fit—an H7/p6 interference fit—range upwards from around 5% of the yield strength that is to say, from about 15 to about 50 Newtons/mm².

The motion, and the galling, are rapid. As noted, the expression "rapid" is difficult to define, but is generally such the the galling is significant, even complete, within half a second or so, and even within a tenth of a second or less (depending upon the precise circumstances). Where comparatively large relative motions are effected, the speed with which they are carried out is likely to be around 20 mm/sec, although speeds of around 5 m/sec have been successfully used.

The feature of the present invention that constitutes both the improvement of and the addition to the invention of the aforementioned Application is the use of an electric current passing between the two bodies while the join is being formed, the current resulting in the heating and softening, and thus the more easily achieved deformation, of the in-contact asperities. The advantages of this may seem self-evident, but it is worth considering the actual figures involved. Thus, if the temperature of a typical asperity on a mild steel surface is raised on average from 20° C. to 420° C. its contact temperature could be twice this, so its yield point might be reduced by as much as 60%, so that the force needed to deform the asperity will consequently also be reduced by 60%. Thus, for a typical low carbon steel the resistance to shear will be lowered from about 150 Newtons/$mm^2$ to about 60 Newtons/$mm^2$ (and while the heat generated by plastic deformation is also reduced, this is more than compensated for by the current heating effect).

The method of the invention involves the passing of an electric current between the two bodies being joined. This current may take any suitable form, and may be driven in any appropriate way, as is now explained.

The more conventional options for the form and nature of the supply of the current are: resistance heating, with a current frequency in the range OHz (DC) to 500Hz; induction heating, using the Faraday effect, with frequencies in the range 100Hz to 500kHz; RF (radio frequency) dielectric heating, using frequencies in the range 500kHz to 100MHz; and microwave heating, using frequencies of 100MHz and up.

Within these there are a flutuber of variations possible. For instance, external energy in the form of electrical currents can be used either in the form of sinusoidal AC or as AC with some DC component. Moreover, the type of supply may be chosen, from across a broad frequency spectrum, as a means of directing the currents to the critical areas. For example, high frequency (induced currents in the frequency range 1kHz to 500kHz, as commonly used in induction heating) will flow increasingly at and near surfaces as the frequency increases to cause selective heating. Then again, the current may be provided as DC or pulsed PC. Low frequency (below 1000Hz) and DC current tends to flow evenly across the full cross section of a conductor, and so heat a part evenly, but the current will be concentrated at joints as they are formed providing the currents are made to flow across the junctions.

Where a pulsed DC current is employed there is the useful effect that the potential drop across the join (resulting from the combination of any small contacts in parallel) can be detected by passing a test pulse through the join, whereafter the power level of the following pulses can be adjusted to ensure that adequate—but only just enough—power is available for softening the asperities in contact at any one instant, so as to minimise the general heating effects. This sampling and power pulsing routine can be repeated, typically at rates of from 10 to 1000 times a second (the frequency chosen will be related to the mating surface roughness, and to the speed of rubbing). The average electric current densities per $mm^2$ overlap range from a few milliamps on first contact to above 15 amps as the joint is formed. The voltages developed across the join will be exceedingly low—typically a millivolts, dropping down to less than 100 microvolts.

The previously mentioned method of sampling of the joint resistance, and then matching the power level to the prevailing conditions, can be extended by using a steadily rising voltage (EMF) waveform (often referred to as a "sawtooth"). Here the current build up due to the initial EMF is sampled, and the final EMF is then set by electronic means to limit the maximum current for each power pulse. Providing the currents are constantly changing, the power can then be coupled inductively to the parts being joined, to avoid the difficulty of passing high levels of DC current through surface contacts, which tends to cause unwanted local heating and oxidation at the contact points, while maintaining the convenience of using DC control circuitry.

If the current is alternating as it is passed through the contacting asperities at the joint interface the flow of electrons (current) will create many small local magnetic fields, each with an associated electric field at 90°. As the frequency rises so the electric field will potentially have a greater dielectric heating effect on the surrounding galling medium, if it is a non-conducting fluid. Since some of the fluid will probably have been damaged as the joint is formed by rubbing due to mechanical shear and the high adiabatic temperature associated with asperity deformation (and the fluid could contain polar and dipolar molecules susceptible the electric fields influence). The resultant dielectric heating within the fluid will destabilize it further to promote further oxygen scavenging.

In practice it is anticipated that resistance and induction heating ranging from mains frequency up to 500kHz will dominate, although micro wave, might provide special advantages in some applications.

The timing of the electric current—that is, if it is applied continuously throughout the formation of the joint, or whether it is mainly or only supplied as the joining, galling, rubbing, process begins, or after the initial rubbing/galling, or even after most of the rubbing/galling, or possibly during an interruption in the rubbing/galling (or, of course, any two or more of these)—is a relevant factor. The electrical energy can be applied so that it is only effective at the initial contact, or it can be applied over such a period or in such amounts that it remains effective throughout the entire rubbing phase. Equally, the energy (in whatever form) might only be applied after completion of rubbing, so as to control the amount of diffusion bonding (see hereinafter) in the final joint. It follows also that energy might first be applied so that it is effective in initiating good galling at first contact, and then again only after rubbing has finished, to form final bonds.

Naturally, as the form or nature of the externally applied energy varies, so will the means of actually coupling it to the parts being joined. Energy for resistance heating can be applied either by direct contact for both DC and AC currents, or preferably, where it is possible (as it is for both AC and varying amplitude DC), via a non-contact induction coil method. In high frequency cases capacitive coupling or a resonant probe becomes practical. When an induction coil is used, and the parts are of suitable shape, size and material, it is in some instances possible to employ this coil also to provide the motion to impel one part into the other magnetically, and so force the parts together to give the rubbing action needed to form a joint.

A further, and very simple, means of inducing a current flow in a joint as it is assembled is to incorporate a magnet into the device used to push the parts together, the flux of the magnet causing local EMFs (generating local eddy currents) as it passes through/cuts the parts. If, for instance, a hammer is employed, then the oscillatory motion of a hammer with a permanent magnet attached to its head would cause a continuously-changing flux, and so produce in the parts useful eddy currents at least some of which would flow across the joint's asperity contacts to give the required heating effect without the need for any further special equipment.

The material used as a gall promoter or anti-lubricant will also influence the choice of how and in what form the external energy will be applied. For instance, for making an assembly with a highly volatile fluid it is possible to destabilize large areas of fluid by rapid oxidation (firing) triggered by a small arc on initial contact and followed by a rapid push assembly of the cleaned and reduced surfaces. In other cases there can be advantages in using a non-volatile fluid so that a reserve or reservoir of unreacted fluid remains trapped in the joint after assembly, to give it the capability of recovering some or all of its strength after slipping on overload. A combination of the above two cases is possible to slow down the oxidation process to allow the reaction time of the fluid film to be optimized against the rubbing speed employed. Effective use can be made of a hamer to alternate and vary the drive-in force, while at the same time to use the hammer to switch the current on and off. This approach permits higher peak levels of external energy (both mechanical and electrical) to be applied, to make joints with superior cyclical fatigue strength.

Naturally, the particular combination of timing and the way the energy is applied will vary according to the engineering needs and the physical limitations of the particular application, as well as the service the joint will provide.

As mentioned above the fluid can influence the means of applying external energy. Equally the choice of fluid will be influenced by the needs of the application. The most important feature is probably the fluid's stability. The volatility, and therefore its chemical stability, can be varied by blending a variety of formulations of silicones. Of particular importance in applying the method of the invention is a blend of decamethyl-cyclopentasiloxane and pentamethyl-hydrogen-cyclopentasiloxane in the ratio 95:5 to 50:50 depending on the application.

One interesting consequence of using a silicone as the gall promoter is that, because it will be an insulator of high dielectric integrity (most silicones are thus), it will tend to concentrate the current flows to enhance the selective heating.

Observations on many practical joints show that it is the first contact sites between the surfaces of the two bodies being joined that are the most likely to initiate galling, and it is believed that this is related to the high mechanical and physical surface energy often available over very small areas at first contact. If additional energy is applied at this stage— in the form of electric-current-derived heat, in accordance with the present invention—then there will be more galling initiation energy, and the quality and consistency of the joints will be improved. The energy levels applied need be relatively low—for instance, merely sufficient to de-stabilize some of the surrounding silicone gall promoter—and certainly nothing like those normally required to strike an arc (and so form a melt pool of metal).

The net effect of the current-induced heating of the present invention is to even out, and so regulate, the "amplitude" of contacting asperities and galls on the two rubbed surfaces. This in turn increases the number of contacts leading to an even distribution of small gall sites formed with lower total rubbing forces (and the galls themselves tend to be more regulated, and uniform, in size). As a result, there are many intimate contact points, causing good interlocking, between the two surfaces.

The addition aspect—the second aspect—of the present invention is now discussed.

The conditions created in the joints made by the aforementioned Application will, in many instances, create favourable conditions for, and allow some inter-atomic diffusion across, the joint interface. This occurs when disrupted and exposed unreacted metal comes into contact across the joint, to form local "diffusion" bonds. However, experience shows these bonds tend to have a random distribution, and to be of uncertain quality. The strength and extent of the bonds will. increase with time, and are dependant on the energy available to drive the diffusion process, and whether this process is impeded by available free oxygen re-oxidising the exposed unreacted metal surfaces.

Therefore, one significant difference between the joins/bonds formed by the method of the aforementioned Application and those achievable using the improved method of the present invention is that the latter joins can take on the nature of diffusion bonds. This process can be visualised as a gradual rearrangement of the atoms within each body after it has been strained, and can, as might be expected, be accelerated by raising the temperature. The rearrangement results in the interlinking of atoms across the contact interface, with the subsequent growth of interatomic bonds with adjacent atoms until the local surface energy is reduced to an equilibrium level.

Diffusion bonding takes place only between two very clean surfaces held very closely together, but it can result in a strong weld-like bond between the two bodies (in the vacuum of space, where surface impurities can evaporate off to give what is in effect a very clean surface, unexpected diffusion bonding, here known as vacuum welding, of two touching parts that should have been free to move relative one to the other was an all too common reason for the failure of early space vehicles and satellites). The conditions obtaining for a few seconds (and sometimes for up to a minute) after a join is formed by the method of the invention are favourable for diffusion bonding to occur; not only are areas of the two surfaces in the most intimate contact (as a result of the galling) but they are effectively extremely clean (the gall promoter has, at least in its preferred form, scavenged all available oxygen, and even reduced the probable surface metal oxide film to free metal).

In another aspect, therefore, the invention provides an addition to the method the subject of our aforementioned Application, in which, after that method has been used to form a join, and the gall-producing rubbing motion has ceased, an electric current is passed across the opposed faces of the join to stimulate and/or accelerate the formation of diffusion bonds therebetween.

For best results the current should already be flowing as the rubbing ceases, for any delay in starting the current flow after the motion has stopped is likely to result in inferior quality diffusion bonds due to the ingression of fresh oxygen reacting with the exposed, clean surfaces.

The duration of the current flow can range from as little as one second up to a minute or more, and—as with the improvement aspect discussed hereinbefore—the current may be applied either continuously or as several separate timed pulses.

In the method of the invention, then, the continuation, or increase, of heating current flow after the rubbing motion has stopped will, provided that localised heating still occurs at the contact points between the galled surfaces, cause diffusion bonding between the two consequent upon the rise in temperature (which rise will typically be of about 200° C. to about 400° C). Moreover, once the heating current has been stopped the diffusion process will continue as the parts cool, and then afterwards until the surface energy reaches equilibrium, and may cause bonding over an area of from as little as 10% to as much as 90% of the joint's overlapping surface.

Under normal circumstances the increase in temperature required to convert a pure "friction" join into a partial diffusion bond will not involve any significant concomitant temperature increase .in the bulk of the bodies, and so there should be no change to the properties of those bodies (such as the hardness of a steel). However, in some cases it may be desirable to "warm" the bodies to the sort of temperatures—say, about 700° C. to 1100° C. for steel)—regarding as "warm working", and so cause a rapid relaxation of stress levels due to re-crystallisation. Although this will result in reduced contact forces within the joint, this should not be critical, because the joint now derives its strength mainly from its partial diffusion nature.

It might be thought that the use of a suitably high heating current passed through the joint immediately after completion of rubbing, to form diffusion bonds across all points in sufficiently close physical contact, which provides what is in essence a weld, is like conventional welding, but this is not so.

The term "welding" is normally interpreted as meaning the joining of two metal surfaces, so they combine at the join and form a common body, by intermixing of their constituent molecules. Conventional fusion welds depend on the interface material being heated to temperatures sufficient to form a melt pool and so, providing the materials are chemically compatible and able to alloy one to the other, they will mix and form strong joints as the melted metal solidifies. It is common to use an electric current as the heat source. As will easily be seen, the method of this invention differs from fusion welds because it allows welds to be made by passing a current but without forming a melt pool at the join interface.

It is also possible to join metals by solid phase welding in which effective bonds are formed between chemically-clean metal surfaces coming into contact at room temperatures. However, in these joints the materials do not mix in the same way as in fusion welds above (the exposed molecules on the cleaned surfaces react with others across the gap by sharing valency band electrons). This process is known as cold pressure welding. Solid phase welding can be accelerated by increasing valency electron mobility and intermolecular vibration by raising the material temperatures and at the same time applying external pressure, and under these conditions there is some migration of atomic particles and some molecular migration generally referred to as diffusion. Such "diffusion bonds" can be just as strong as the previously described "fusion" bonds and tend not to suffer from metallurgical changes due to alloying in fusion "heat affected zones" and associated residual tensile stress and resultant cracking on cooling.

And, of course, as explained hereinbefore use is made of friction in "Friction welding" to heat two surfaces in rubbing contact, but here the temperatures are raised to hot forging temperatures to soften the materials and adsorb many of the surface impurities and oxides, and the heated surfaces are then forced together under extreme pressures to forge an intimate contact.

The "addition" method of the invention forms within the joint many small solid phase welds, and is able to convert these into diffusion bonds extending over a wider area without the use of a special press and furnace with a controlled atmosphere, and without any special care being taken to render, and keep, the surfaces chemically clean.

The method of the invention makes joins (or joints) between bodies, and the invention extends to these joints per se. Thus, in another aspect the invention provides a joint between two bodies constrained in face-to-face contact and binded against lateral motion by the method of the invention.

The method has a practically unlimited number of applications, although for the most part the joints made therein fall within three main categories. The first is the type wherein pieces are locked against rotation onto shafts (such as cams onto camshafts, weights onto counterbalance shafts, interconnecting webs in crankshafts, or gears onto gearshafts); such joints transmit or resist torsion forces and axial thrust. The second is the sort wherein pieces are locked together against both rotation and translation via a joining collar (such as two pipes joined by a connector ferrule). A third type is that special category of joints which are not "round" but are instead one body secured against linear motion within a slot in another, as typified by a hardened cutting blade in its holder, or a turbine blade assembled onto its hub. Various particular applications of these types are described in more detail in the Specification of the aforementioned Application, and need no further comment here.

As will be apparent, there are many applications for the method of the invention, and the invention extends to them all per se, as well as to the joints and articles made thereby. In particular, it extends to camshafts, gearshafts and crankshafts wherein the cams, gear-wheels and webs have be secured to their shafts by such a method, and to pipes and other rod-like members that have been secured abutted one to the other by such a method.

The method of the invention concerns the application of heating electric current to the improvement of joints made employing galling enhanced by the use of a gall-promoting agent. It might be thought that a similar improvement would be obtainable for any galled joint, whether made with the assistance of a gall promoter or not, and in principle that seems to be the case, and so is part of the present invention. However, in practice the work done so far in this area suggests that, while galled joints can be made without the use of a gall promoter, they are not so good as those made with one . . . and the joint improvements achievable by the use of a heating electric current are best when a gall promoter is utilised.

Various embodiments of the invention are now described, though by way of illustration only, with reference to the accompanying Drawings and the following Example. In the Drawings:

FIGS. 1B' to E' show a sequence comparable to that of FIGS. 1A to 1D but in accordance with the electric-current-using method of the present invention;

The "cartoon" sequence of FIG. 1 explains the basic galling concept which lies behind the method of the invention (more realistic examples of this basic concept are exemplified in the aforementioned Application). FIG. 1 shows the facing, and "in contact" micro-rough surfaces (11, 12) of two bodies (13, 14) held together by an applied force (arrows F). FIG. 1B shows the gall-promoter (15) inserted between the surfaces, whereupon they are moved sideways relative one to the other (represented by the left/right arrows M). As they move, the initial movement results in galling, where material (16) from the upper surface 11 is transferred to the lower 12. This galling builds up rapidly, to the point where the friction between the two surfaces is so great that provided the holding forces F are maintained the surfaces bind together (represented in FIG. 1D; FIG. 1D is at a slightly smaller scale than the others) as a result of the gear-tooth-like mechanical interaction between them, and further movement—except with a very considerable increase in the motion-causing forces—is prevented.

Figures 1A, 1B:
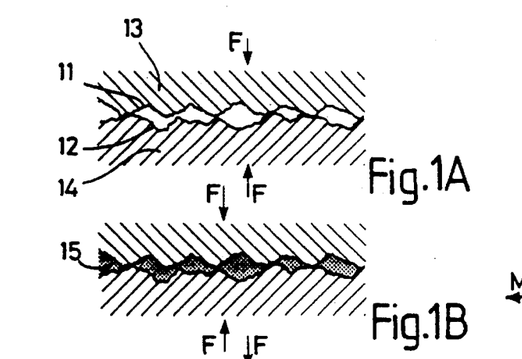
FIGS. 1A to D show a sequence of sectional views through a pair of surfaces being bonded together by the basic galling method of the invention of the aforementioned Application.
Figure 1B:
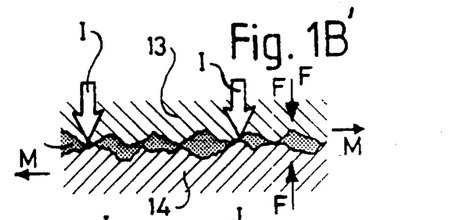
Figure 1C:
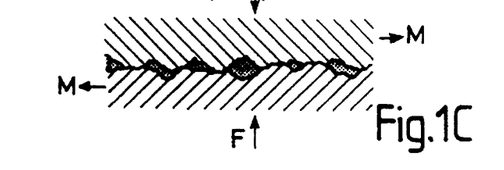
Figure 1D:
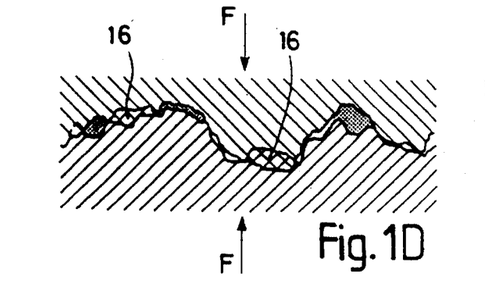

FIG. 1B' to E' is a further cartoon sequence like the previous one but showing how the original friction joint formation is improved by the passage of a substantial electric current. FIG. 1B' (comparable to FIG. 1B) shows in sectional view the two surfaces 11, 12 held in rubbing asperity contacts (motion indicated by horizontal arrows M), with a gall-enhancing liquid 15 placed between the surfaces. An external force is applied generally to both surfaces to maintain them in good contact, and is shown by arrows "F". An external electrical current (denoted by arrows I)) flows across the contacting asperities, and causes local heating and softening, only initially at the first contacting asperities. This results in the number of contact points rapidly increasing due to the first contacts deforming, and in the contact area of the heated asperity contacts increasing, and is shown in FIG. 1C' (which is directly comparable to FIG. 1C, but represents a state that is arrived at much more quickly and easily because of the current-induced heating). FIG. 1D', comparable to FIG. 1D, shows that current paths have increased still further, and that galling has occurred to transfer material 16 from one face to the other (again, this occurs more quickly and easily than in the case of the basic concept, of FIG. 1D, where there is no assistance from electric current). This galling and transfer leads to heavy disruption of the surface material to form strong mechanical interlocks.

Figure 1E:
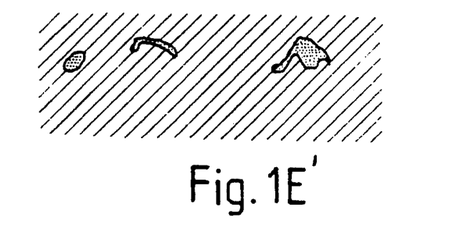

At this point the situation is very like that of the basic idea, as shown in FIG. 1C', save that—though it is probably not entirely clear from the Figures—slightly more galling may have taken place, and that the galling has occurred more easily. FIG. 1E', however, shows a major difference between the method of the present invention and that of the basic concept, which is how, if the current is maintained after rubbing has ceased, the two surfaces "diffuse" together to form a continuous intermetallic bond.

Figure 2:
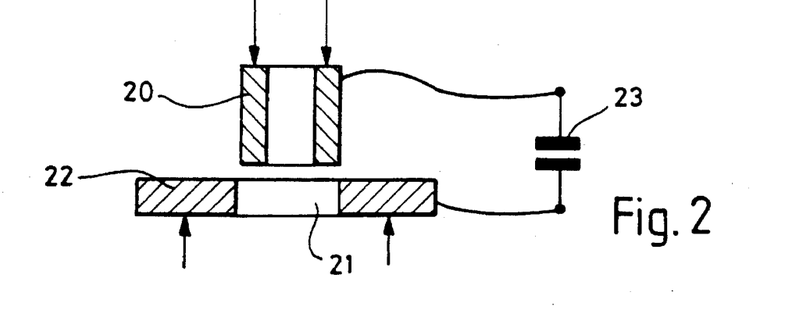
FIG. 2 shows in section a simple embodiment of the invention in which a hollow shaft is forced into the bore of a disc or wheel.

The present invention resides in the use of a heating electric current to improve the efficiency and uniformity of the galling action just described. One simple way of putting this into operation is shown in FIG. 2, which involves a hollow shaft (20) which is forced into the bore (21) of a disc or wheel (22) by an external press (not shown). As the shaft 20 enters the bore the energy stored in a capacitor (23) is discharged across the initial contact to form a ring of micro-welds that develop into galls as the shaft is driven in.

Figure 3:
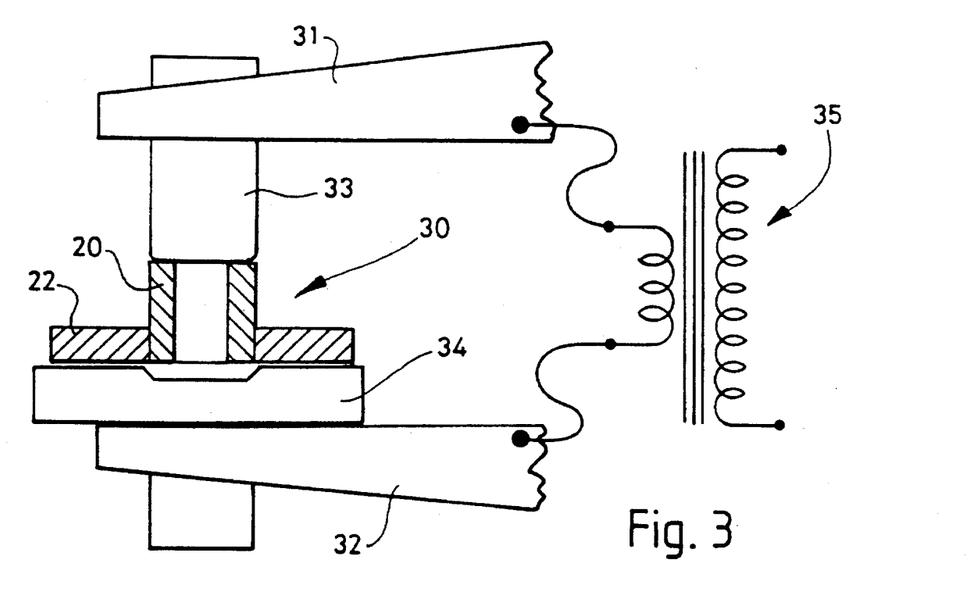
FIG. 3 shows an extension of the FIG. 2 embodiment, where a preformed joint is arranged in a spot welding machine.

An extension of this simple embodiment is shown in FIG. 3, where a preformed joint (as 30% of the same type as the FIG. 2 joint) is arranged between the upper and lower rocker arms (31, 32), and the modified upper and lower contacts (33, 34) of a spot welding machine. This machine causes a large AC current (from the transformer 35) to flow across the joint junction as the control switch (not shown) is closed in the welder (so as effectively to couple the secondary of the transformer 35 across the joint) to form a diffusion bond. This approach can readily be incorporated in a power press.

Figure 4:
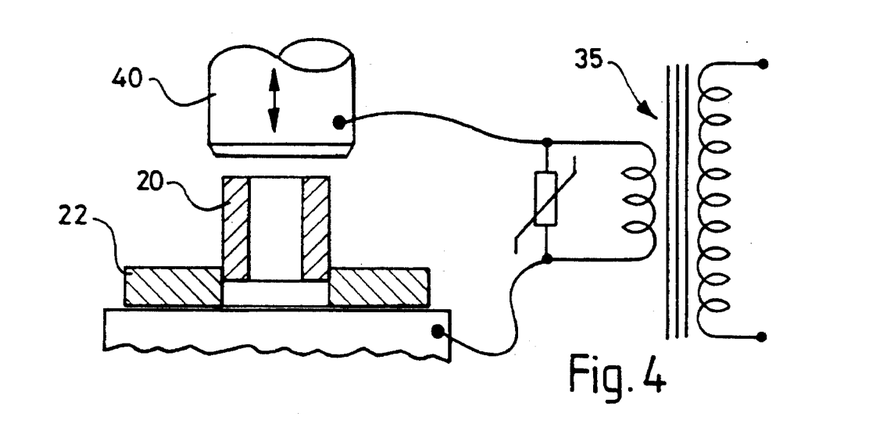
FIG. 4 shows the method of the invention involving the use of a hammer to combine driving the parts together with the switching of the current.

The embodiment of FIG. 4 illustrates how the machine switch (not shown) of the FIG. 3 arrangement can be replaced with a hammer (40) to combine driving the shaft 20 and wheel 22 together with the switching of the current being due to the repetitive contacts of the hammer 40.

Figure 5:
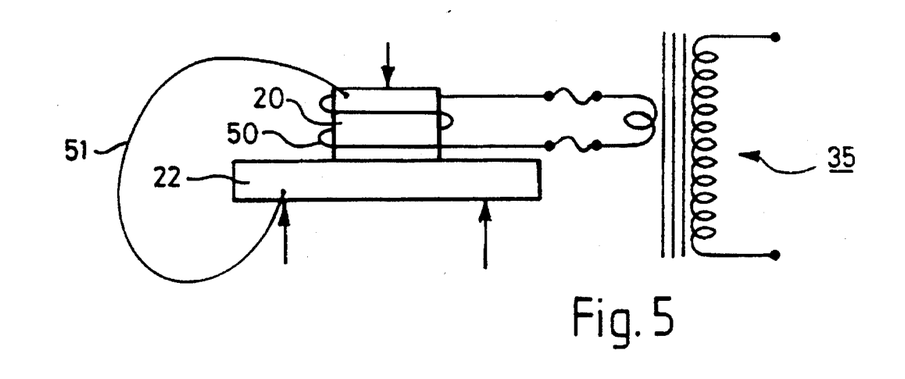
FIG. 5 shows an embodiment of the invention employing an induction coil to induce eddy currents.

In FIG. 5 there is shown the use of an induction coil (50) carrying an AC current and arranged to induce eddy currents in the joint. The eddy currents circulate within the component shaft 20 and wheel 22 near the joint and across the joint; if an external path (51) is provided to form a loop circuit it will maximise the flow of currents across the joint due to the induced EMF, especially at low frequencies.

Figure 6:
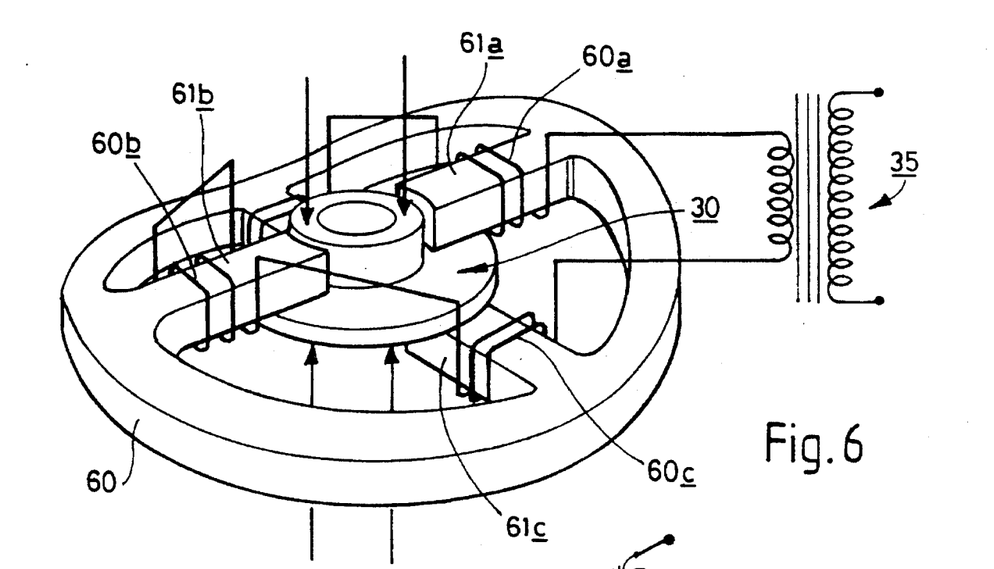
FIG. 6 shows a more elaborate use of an induction coil.

An extension of the eddy current induction loop of FIG. 5 is shown in FIG. 6. This illustrates how a coil can be split into several windings (60a, b, c), rather like the stator of an electric induction motor. Each winding has an iron core (61) with separate pole pieces (61a b,c) one for each winding 60; the core acts to focus the magnetic field onto the joint 30, located at the centre. If the parts are ferritic then they will form part of the magnetic circuit for greater effectiveness.

The iron core 61 can take the form of a laminated stack or a high resistivity sintered ferrite body, the latter being particularly good at intensifying the magnetic flux at a particular location while causing very low "iron" losses. By cascading the coils 60 the magnetic field can be made to alternate. If a three-phase winding is used the magnetic field will effectively rotate, and so improve heating.

By adjusting the pole piece 61a,b,c positions the flux can be made to intersect the junction 30. An example of this is to place alternate poles either side of the disc 22 being assembled onto a shaft 20, as shown. This ensures the induced EMF spans the junction 30, and causes current to flow whose internal field opposes the external applied field in accordance with the right hand screw rule (and, when motion is involved, Lenz's law). As the frequency is increased so the currents flow increasingly close to the surface, due to the "radio frequency skin effect", and the junction represents a proportionally larger impedance across which the heating occurs.

Figure 7:
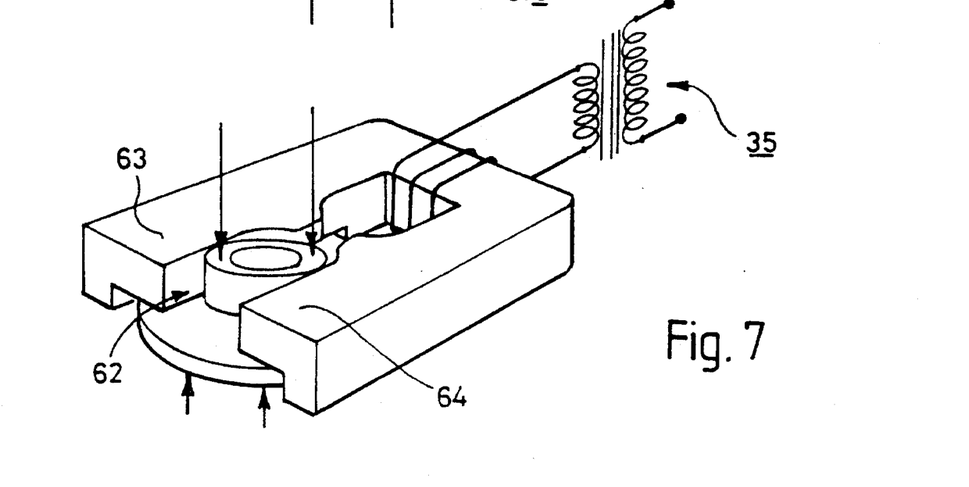
FIG. 7 shows yet another induct embodiment.

A further option for an induction system is shown in FIG. 7. Here the flux is applied laterally across the joint. This has the advantage that a tubular joint can be simply laid into the gap (62) in the iron core. Thus, this approach ends itself to applications such as the assembly of tubular frame structures like bicycle frames where it is convenient to be able quickly to load and unload parts. It is perhaps worth mentioning that similar arrangements can be constructed with a coil placed one on each pole (63 & 64) and the coils connected in phase to maximise the field.

EXAMPLE

Preparation of a "diffusion-bond enhanced" galled joint

A "diffusion-bond enhanced" galled joined between two bodies of the type shown in FIG. 3 was made by a method according to the invention. A shaft was forced part way into a tightly-fitting sleeve, then an electric current was passed through the join, and then the shaft was pushed further into the sleeve. A measurement was made of the forces required to push in the shaft, and this was taken as an indication of the strength of the formed joint (and thus of the efficacy of the use of the electric current technique).

The materials

Two different joints were thus made, using the following parts (the dimensions are in mm):

| Specimen | Shaft diameter | Sleeve aperture diameter | Interference |
|---|---|---|---|
| 1 | 12.031 | 12.016 | 0.015 |
| 2 | 12.024 | 12.016 | 0.008 |

The parts were made from EN1A free machining mild steel (also known as 220M07, or AISI/SAE 1113). Each shaft had an insertable length of 22mm, and a small lead-in taper of about 1mm was machined on both the shaft end and on the bore entry. The "join" surface of the shafts was provided with a relief pattern, a helical groove of 0.4mm radius on a 1mm pitch machined thereinto, and after this machining the parts were left for at least 4 hours to allow the surface oxides to stabilize. The machined surface roughness was then about 5 micron Ra.

The procedure

Without any special cleaning other than a wipe with a clean rag, the surfaces to be joined were given a light coating of gall-promoting agent (Dow Corning 345 silicone fluid). The specimen was mounted in a jig loosely holding the parts in the correct relationship (with the lead-in tapers in light contact), and the jig was loaded into a Nounsfield Tensometer (a well-known piece of apparatus in which, rather like as in a carpentry cramp, two pieces can be driven towards, and into, each other, and which can measure and record the applied forces as this happens). The Tensometer was then started, and the forces necessary to drive in the shaft measured as it was so driven in.

In each case, the shaft was first driven part way (15mm) into the sleeve, and the the Tensometer was stopped, and jig removed, and the parts electrically connected across a suitable current source (a Meritus Spot Welding Machine type PSi5A—a 15KVA machine that delivers at least 2,000Å— set to its low current range and to deliver current pulses of 0.2sec duration). The parts were then given five 0.2sec bursts of 2,500Å 50c/s current (with about 5 sec pauses between each), an average current density of about 5Å/mm'. They were then allowed to cool, and reloaded into the Tensometer, which was then re-started, and allowed to drive the shaft fully into the sleeve.

The Results

Figure 8:
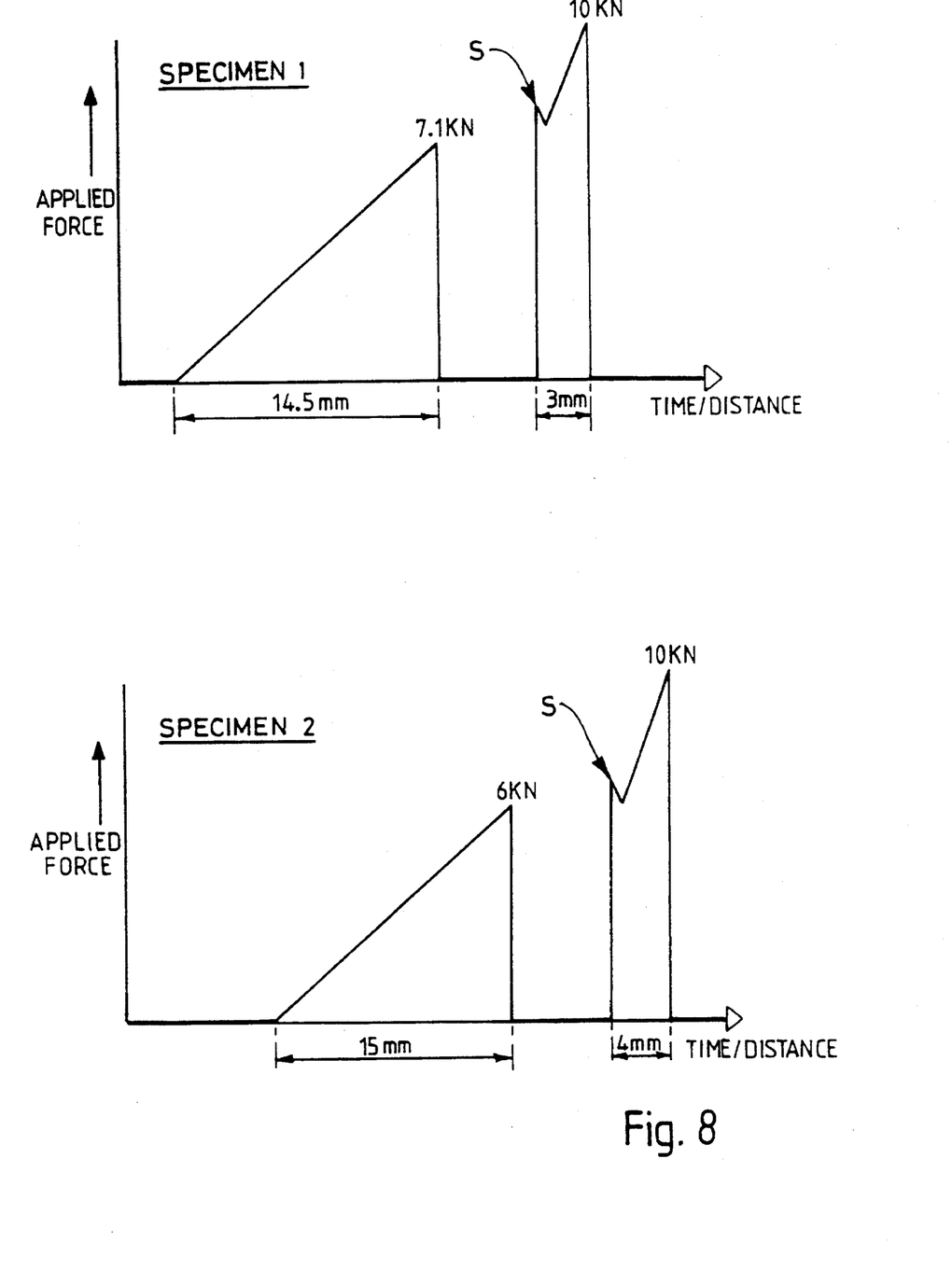
FIG. 8 is a graph of the Test Results obtained in the Example described hereinafter.

The results are shown graphically in FIG. 8, and are now explained.

In each case, with a 10kN beam in the Tensometer, the shaft was forced into the sleeve to a depth of around 15mm. The initial slope of the graph (0.49kN/mm for Specimen 1;0.40kN/mm for Specimen 2) shows the applied force growing linearly but slowly as the shaft is driven in (and continually-increasing galling takes place). After the passage of the electric current, however, the graph shows (in the right-hand portion) that the growth of the force necessary is much faster the steeper slope (0.97kN/mm and 0.85kN/mm for Specimens 1 and 2 respectively)—indicating that the join strength had significantly increased (because of diffusion bonding) as a result of the use of current. The spike (S) is believed to represent the initial rupturing of the diffusion bonds as the pushing is re-started.

It will be observed that the use of current has considerably reduced the ratio of the difference in strength between the two specimens, from a 1:1.25 spread to 1:1.14.

I claim:

1. A method of securing against lateral motion two bodies held in face-to-face asperity contact by a force not sufficient to cause forging, thereby to make a join between the two bodies, by effecting lateral relative motion of the two surfaces resulting in galling therebetween out without imparting frictional energy sufficient to cause heating and gross softening of the bulk material at or near the surface of either body, this galling binding the surfaces against further such motion, in which method an electric current is passed between the faces: (A) while the join is being formed; (B) after the join is formed; or (C) while the join is being formed and after the join is formed the current resulting in the heating and softening, but not melting, of the in-contact asperities.

2. A method, as claimed in claim 1, of securing against lateral motion two bodies held in face-to-face asperity contact, thereby to make a join between the two bodies, by inserting into the interface between the two bodies a material that on minimal initial lateral relative motion of the two surfaces promotes rapid but controllable galling between the two surfaces, this galling binding the surfaces against further such motion, in which method, to increase the galling potential of the two bodies' surfaces when placed in rubbing asperity contact in the presence of the gall-promoting material, there is employed the improvement of passing an electric current between the faces while the join is being formed.

3. A method as claimed in either of the preceding claims applied to the making of joints between bodies of iron and its alloys.

4. A method as claimed in claim 3, including initiating the flow of current before the rubbing ceases.

5. A method as claimed in claim 1 applied to the making of joints between bodies of iron and its alloys.

6. A method as claimed in claim 1 in which a polysiloxane is employed as a gall-promoting agent.

7. A method as claimed in claim 6 in which the polysiloxane is selected from the group consisting of the medium molecular weight poly(dimethyl)siloxanes commercially available from Dow Corning under the Marks MS 200, Dow Corning 531 and 536, and Dow Corning 344 and 345, and combinations thereof, and a blend of decamethyl-cyclopentasiloxane and pentamethyl-hydrogen-cyclopentasiloxane in a weight ratio of from 95:5 to 50:50.

8. A method as claimed in claim 1 in which there is applied external electric current energy either in the form of sinusoidal AC, or AC with some DC component, or as DC or pulsed DC.

9. A method as claimed in claim 8 in which, where a pulsed DC current is employed, either the potential drop across the join is detected (by passing a test pulse through the join), whereafter the power level of the following pulses can be adjusted to ensure that adequate power is available for softening the asperities in contact at any one instant, so as to minimise the general heating effects, or there is used a steadily rising voltage (EMF) waveform, and the current build up due to the initial EMF is sampled, the final EMF then being set by electronic means to limit the maximum current for each power pulse.

10. A method as claimed in claim 1 in which the required externally-applied energy is delivered to the parts via a non-contact induction coil method.

11. A joint between two bodies constrained in face-to-face contact and binded against lateral motion by a method as claimed in claim 1.

12. A method as claimed in claim 2 in which the two bodies comprise iron or steel, in which a polysiloxane is employed as the gall-promoting material, in which the polysiloxane is distributed on the surface of each of the bodies prior to their being held in face-to-face asperity contact, in which said lateral relative motion is effected for 0.1 to 0.5 second at a speed of 10 to 30 mm/sec, and in which the electric current is generated by a non-contact induction coil method.

13. A method as chimed in claim 12 in which the bodies held in face to face asperity contact are a hollow shaft and the bore of a disc or wheel.

14. A method as claimed in claim 12 in which the bodies held in face to face asperity contact are two thin-walled tubes, an end of one lying within an end of the other.

15. A method, as claimed in claim 1, of securing against lateral motion two bodies held in face-to-face asperity contact, thereby to make a join between the two bodies, by inserting into the interface between the two bodies a material that on minimal initial lateral relative motion of the two surfaces promotes rapid but controllable galling between the two surfaces, this galling binding the surfaces against further such motion,     in which method, to increase the galling potential of the two bodies' surfaces when placed in rubbing asperity contact in the presence of the gall-promoting material, there is employed the improvement of passing an electrical current between the faces while the join is being formed and after the join is formed.

16. A method as claimed in claim 15 in which the two bodies comprise iron or steel, in which a polysiloxane is employed as the gall-promoting material, in which the polysiloxane is distributed on the surface of each of the bodies prior to their being held in face-to-face asperity contact, in which said lateral relative motion is effected for 0.1 to 0.5 second at a speed of 10 to 30 mm/sec, and in which the electric current is generated by a non-contact induction coil method.

17. A method as claimed in claim 15 in which the bodies held in face to face asperity contact are a hollow shaft and the bore of a disc or wheel.

18. A method as claimed in claim 15 in which the bodies held in face to face asperity contact are two thin-walled tubes, an end of one lying within an end of the other.

* * * * *